(12) United States Patent
Wshah et al.

(10) Patent No.: US 11,017,267 B2
(45) Date of Patent: May 25, 2021

(54) SYSTEM AND METHOD FOR EXPANDING AND TRAINING CONVOLUTIONAL NEURAL NETWORKS FOR LARGE SIZE INPUT IMAGES

(71) Applicant: Conduent Business Services, LLC, Dallas, TX (US)

(72) Inventors: Safwan R. Wshah, Webster, NY (US); Beilei Xu, Penfield, NY (US); Orhan Bulan, Webster, NY (US); Jess R. Gentner, Rochester, NY (US); Peter Paul, Penfield, NY (US)

(73) Assignee: Conduent Business Services, LLC, Dallas, TX (US)

( * ) Notice: Subject to any disclaimer, the term of this patent is extended or adjusted under 35 U.S.C. 154(b) by 194 days.

(21) Appl. No.: 16/367,309

(22) Filed: Mar. 28, 2019

(65) Prior Publication Data
US 2019/0220702 A1     Jul. 18, 2019

Related U.S. Application Data

(62) Division of application No. 15/194,757, filed on Jun. 28, 2016, now Pat. No. 10,303,977.

(51) Int. Cl.
*G06K 9/62*     (2006.01)
*G06N 3/04*     (2006.01)
(Continued)

(52) U.S. Cl.
CPC ....... *G06K 9/6256* (2013.01); *G06K 9/00838* (2013.01); *G06K 9/46* (2013.01);
(Continued)

(58) Field of Classification Search
CPC ............. G06K 9/00838; G06K 9/6274; G06K 9/6256; G06K 9/46; G06K 9/6267; G06K 9/4628; G06N 3/0454; G06N 3/08
See application file for complete search history.

(56) References Cited

U.S. PATENT DOCUMENTS

| 4,941,122 A | 7/1990 | Weideman |
|---|---|---|
| 5,075,871 A | 12/1991 | Weideman |

(Continued)

FOREIGN PATENT DOCUMENTS

CN     104346607 A     2/2015

OTHER PUBLICATIONS

Kravchik, Moshe, and Asaf Shabtai. "Detecting cyber attacks in industrial control systems using convolutional neural networks." Proceedings of the 2018 Workshop on Cyber-Physical Systems Security and PrivaCy. 2018. (Year: 2018).*

(Continued)

*Primary Examiner* — Pinalben Patel
(74) *Attorney, Agent, or Firm* — Gibb & Riley, LLC

(57) ABSTRACT

According to exemplary methods of training a convolutional neural network, input images are received into a computerized device having an image processor. The image processor evaluates the input images using first convolutional layers. The number of first convolutional layers is based on a first size for the input images. Each layer of the first convolutional layers receives layer input signals comprising features of the input images and generates layer output signals that include signals from the input images and ones of the layer output signals from previous layers within the first convolutional layers. Responsive to an input image being a second size larger than the first size, additional convolutional layers are added to the convolutional neural network. The number of additional convolutional layers is based on the second size in relation to the first size. The additional convolutional layers are initialized using weights from the first convolutional layers. Feature maps comprising the layer output signals are created.

20 Claims, 13 Drawing Sheets

(51) Int. Cl.
*G06N 3/08* (2006.01)
*G06K 9/46* (2006.01)
*G06K 9/00* (2006.01)

(52) U.S. Cl.
CPC ......... *G06K 9/4628* (2013.01); *G06K 9/6267* (2013.01); *G06K 9/6274* (2013.01); *G06N 3/0454* (2013.01); *G06N 3/08* (2013.01)

(56) References Cited

U.S. PATENT DOCUMENTS

| | | | |
|---|---|---|---|
| 5,647,027 | A | 7/1997 | Burges et al. |
| 7,295,687 | B2 | 11/2007 | Kee et al. |
| 7,502,495 | B2 | 3/2009 | Zhang et al. |
| 7,747,070 | B2 | 6/2010 | Puri |
| 8,380,647 | B2 | 2/2013 | Perronnin et al. |
| 9,111,136 | B2 | 8/2015 | Paul et al. |
| 9,159,137 | B2 | 10/2015 | Huang et al. |
| 2010/0214936 | A1* | 8/2010 | Ito .................. G06N 3/04 370/252 |
| 2011/0135192 | A1* | 6/2011 | Yokono ............ G06K 9/4614 382/160 |
| 2015/0278642 | A1 | 10/2015 | Chertok et al. |
| 2015/0371100 | A1 | 12/2015 | Wshah et al. |
| 2016/0035078 | A1* | 2/2016 | Lin .................. G06K 9/66 382/157 |
| 2016/0104056 | A1 | 4/2016 | He et al. |
| 2016/0259994 | A1* | 9/2016 | Ravindran ........... G06N 3/08 |
| 2017/0357879 | A1* | 12/2017 | Odaibo ............. G06K 9/627 |
| 2018/0137338 | A1* | 5/2018 | Kraus ............... G06N 3/084 |
| 2018/0150740 | A1* | 5/2018 | Wang ............... G06K 9/2054 |
| 2018/0189613 | A1* | 7/2018 | Wolf ................ G06K 9/6202 |

OTHER PUBLICATIONS

He et al., "Spatial Pyramid Pooling in Deep Convolutional Networks for Visual Recognition", arXiv:1406.4729v4 [cs.CV] Apr. 23, 2015, pp. 1-14.

David Stutz, "Understanding Convolutional Neural Networks", Seminar Report, Aug. 30, 2014, pp. 1-23.

Vincent Cheung et al., "An Introduction to Neural Networks", Signal & Data Compression Laboratory Electrical & Computer Engineering University of Manitoba Winnipeg, Manitoba, Canada, May 27, 2002, pp. 1-45.

Rob Fergus, "Deep Convolutional Neural Networks for Image Classification", Multiple Slides (NYU and Facebook), date unknown, pp. 1-55.

Kristen Grauman et al., "The Pyramid Match Kernel: Discriminative Classification with Sets of Image Features", In Proceedings of the IEEE International Conference on Computer Vision, Beijing, China, Oct. 2005, pp. 1-8.

Christian Szegedy et al., "Going Deeper with Convolutions", IEEE Eplore, Computer Vision Foundation, 2015, pp. 1-9.

Svetlana Lazebnik et al., "Beyond Bags of Features: Spatial Pyramid Matching for Recognizing Natural Scene Categories", 2006, pp. 1-8.

U.S. Appl. No. 15/194,757, Restriction Requirement dated May 22, 2018, pp. 1-7.

U.S. Appl. No. 15/194,757, Office Action Communication dated Aug. 8, 2018, pp. 1-27.

U.S. Appl. No. 15/194,757, Notice of Allowance dated Feb. 13, 2019, pp. 1-15.

\* cited by examiner

SYSTEM AND METHOD FOR EXPANDING AND TRAINING CONVOLUTIONAL NEURAL NETWORKS FOR LARGE SIZE INPUT IMAGES

CROSS-REFERENCE TO RELATED APPLICATIONS

The present invention claims the benefit under 35 U.S.C. § 120 as a Division of U.S. patent application Ser. No. 15/194,757 filed on Jun. 28, 2016, now U.S. Pat. No. 10,303,977 issued on May 28, 2019, the entire teachings of which are incorporated herein by reference, in its entirety.

BACKGROUND

Systems and methods herein generally relate to image recognition using a neural network and, more particularly, to training convolutional neural networks for large size input images.

Recently, deep learning has attracted more attention in the computer vision community because of its performance in terms of classification, detection, and recognition accuracy. However, there is a technical issue in the training and testing of the Convolutional Neural Networks (CNNs) that are used for image classification and detection: the prevalent CNNs require a fixed input image size (e.g., 256×256), which limits both the aspect ratio and the scale of the input image. When applied to images of arbitrary sizes, most current methods fit the input image to the required size by cropping or warping of the input image. CNNs require a fixed input size because a CNN mainly consists of two parts: convolutional layers and fully-connected layers that follow. The convolutional layers operate in a sliding-window manner and output feature maps that represent the spatial arrangement of the activations and the spatial scale of the activations. In fact, convolutional layers do not require a fixed image size and can generate feature maps of any size. On the other hand, the fully-connected layers need to have fixed size/length input by their definition. Hence, the fixed size constraint comes only from the fully-connected layers, which exist at a deeper stage of the network. A simple approach to accommodate larger input image size is to modify the parameters of the convolutional filters so that the output at the last convolutional layer will fit the size requirement of the fully connected layers. However, the scale of the spatial features extracted will then vary depending on the input image size. Another approach is to replace the pooling layers in the current network with a spatial pyramid pooling. Spatial pyramid pooling can maintain spatial information by pooling in local spatial bins. These spatial bins have sizes proportional to the image size, so the number of bins is fixed regardless of the image size. This is in contrast to the sliding window pooling of most prevalent deep networks, where the number of sliding windows depends on the input size. In the method utilizing spatial pyramid pooling, in each spatial bin, the responses of each filter (e.g., max pooling) was pooled. The outputs of the spatial pyramid pooling are kM-dimensional vectors with the number of bins denoted as M (k is the number of filters in the last convolutional layer). The fixed-dimensional vectors are the input to the fully-connected layer. This approach maintains the size of the fully connected layer by using spatial pyramid pooling at the last convolutional layer.

SUMMARY

Systems and methods herein enable a method to overcome the input size constraints imposed by most existing Convolutional Neural Networks (CNNs). Traditional CNNs require that inputs be of a given fixed size, so images are usually cropped or resized to match the input size requirements of the network, which may introduce undesired side effects. The method disclosed herein adds additional convolutional layers (or modules) to accommodate large-size input images using a two-step training process that first trains the small CNNs with reduced-size images, then uses the weights to initialize the expanded CNNs for training/testing with large-size images.

Benefits of the invention include that it enables support of variable size inputs to existing networks with some modifications to the hyperparameters of the networks. Additionally, the training method benefits from leveraging aspects of transfer learning, which is useful to initialize the network such that it converges and converges fast.

According to exemplary methods of training a convolutional neural network herein, input images are received into a computerized device having an image processor. The image processor evaluates the input images using first convolutional layers. The number of first convolutional layers is based on a first size for the input images. Each layer of the first convolutional layers receives layer input signals comprising features of the input images and generates layer output signals. The layer input signals include signals from the input images and ones of the layer output signals from previous layers within the first convolutional layers. Responsive to an input image being a second size larger than the first size, additional convolutional layers are added to the convolutional neural network. The number of additional convolutional layers is based on the second size in relation to the first size. The additional convolutional layers are initialized using weights from the first convolutional layers. Feature maps comprising the layer output signals are created.

According to exemplary methods herein, a trained convolutional neural network (CNN) is created. The training of the CNN comprises evaluating training input images using first convolutional layers. The number of first convolutional layers is based on a first size for the training input images. Each layer of the first convolutional layers receives layer input signals comprising features of the input images and generates layer output signals. Responsive to a training input image being a second size larger than the first size, additional convolutional layers are added to the CNN. The number of additional convolutional layers is based on the second size in relation to the first size. The additional convolutional layers are initialized using weights from the first convolutional layers. Feature maps comprising the layer output signals are created. A plurality of feature maps of an output of at least one selected layer of the trained CNN is selected according to values attributed to the plurality of feature maps by the trained CNN. For each of the plurality of feature maps, a location corresponding thereto in an image space of a test input image is determined. Interest points of the test input image are defined, based on the locations corresponding to the plurality of feature maps. The test input image is classified, based on the interest points.

Systems herein include a processing unit, a memory operationally connected to the processing unit, and an imaging device connected to the processing unit. The memory comprises feature maps comprising layer output signals from a trained convolutional neural network (CNN). The imaging device receives an image comprising a set of pixels. The processing unit selects a plurality of feature maps from the memory. For each of the plurality of feature maps, the processing unit determines a location corresponding thereto in an image space of the image. The processing unit defines interest points of the image, based on the locations corresponding to the plurality of feature maps. The processing unit classifies the test input image based on the interest points.

According to a computer system for training a convolutional neural network, the computer system comprises a program product comprising a tangible computer readable storage medium having program code embodied therewith. The program code is readable and executable by a computer to provide an application to perform a method. According to the method, a trained convolutional neural network (CNN) is created. The training of the CNN comprises evaluating training input images using first convolutional layers. The number of first convolutional layers is based on a first size for the training input images. Each layer of the first convolutional layers receives layer input signals comprising features of the input images and generates layer output signals. Responsive to a training input image being a second size larger than the first size, additional convolutional layers are added to the CNN. The number of additional convolutional layers is based on the second size in relation to the first size. The additional convolutional layers are initialized using weights from the first convolutional layers. Feature maps comprising the layer output signals are created. A plurality of feature maps of an output of at least one selected layer of the trained CNN is selected according to values attributed to the plurality of feature maps by the trained CNN. For each of the plurality of feature maps, a location corresponding thereto in an image space of a test input image is determined. Interest points of the test input image are defined, based on the locations corresponding to the plurality of feature maps. The test input image is classified, based on the interest points.

These and other features are described in, or are apparent from, the following detailed description.

BRIEF DESCRIPTION OF THE DRAWINGS

Various examples of the systems and methods are described in detail below, with reference to the attached drawing figures, which are not necessarily drawn to scale and in which.

DETAILED DESCRIPTION

Figure 1:
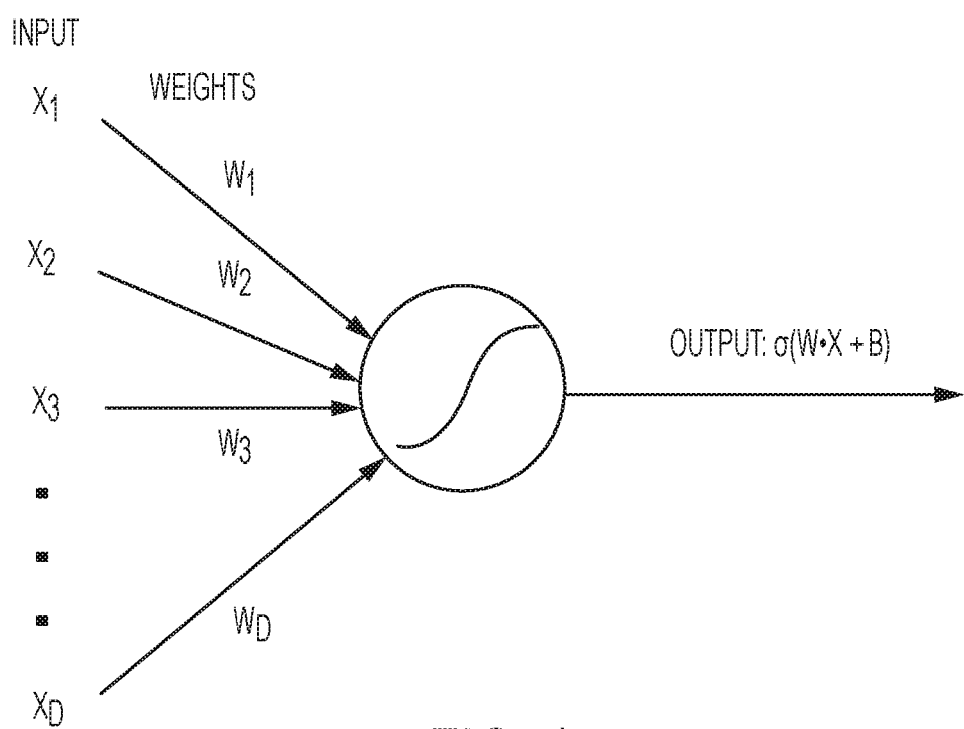
FIG. 1 shows a single level of a neural network according to systems and methods herein.

For a general understanding of the features of the disclosure, reference is made to the drawings. In the drawings, like reference numerals have been used throughout to identify identical elements. While the disclosure will be described hereinafter in connection with specific devices and methods thereof, it will be understood that limiting the disclosure to such specific devices and methods is not intended. On the contrary, it is intended to cover all alternatives, modifications, and equivalents as may be included within the spirit and scope of the disclosure as defined by the appended claims.

Certain computer problems, such as character recognition and image recognition are known to be well handled by machine-leaning techniques. Chief among these is the use of neural networks. Neural networks are a class of algorithms based on a concept of inter-connected "neurons." Referring to FIG. 1, in a typical neural network, input neurons contain data values, each of which affects the value of a connected neuron according to connections with pre-defined weights, and whether the sum connections to each particular neuron meet a pre-defined threshold. By determining proper connection strengths and threshold values (a process also referred to as "training"), a neural network can achieve efficient recognition of images and characters. Oftentimes, these neurons are grouped into "layers" in order to make connections between groups more obvious and to teach computation of values.

In machine learning, a convolutional neural network (CNN) is a type of feed-forward artificial neural network in which the connectivity pattern between its neurons is inspired by the organization of the animal visual cortex, whose individual neurons are arranged in such a way that they respond to overlapping regions tiling the visual field. Biological processes inspired convolutional networks, which are variations of multilayer perceptrons designed to use minimal amounts of preprocessing.

When used for image recognition, image classification, etc., convolutional neural networks (CNNs) consist of multiple layers of small neuron collections that process portions of the input image, called receptive fields. The outputs of these collections are then tiled so that their input regions overlap, to obtain a better representation of the original image; this is repeated for every such layer.

Figure 2:
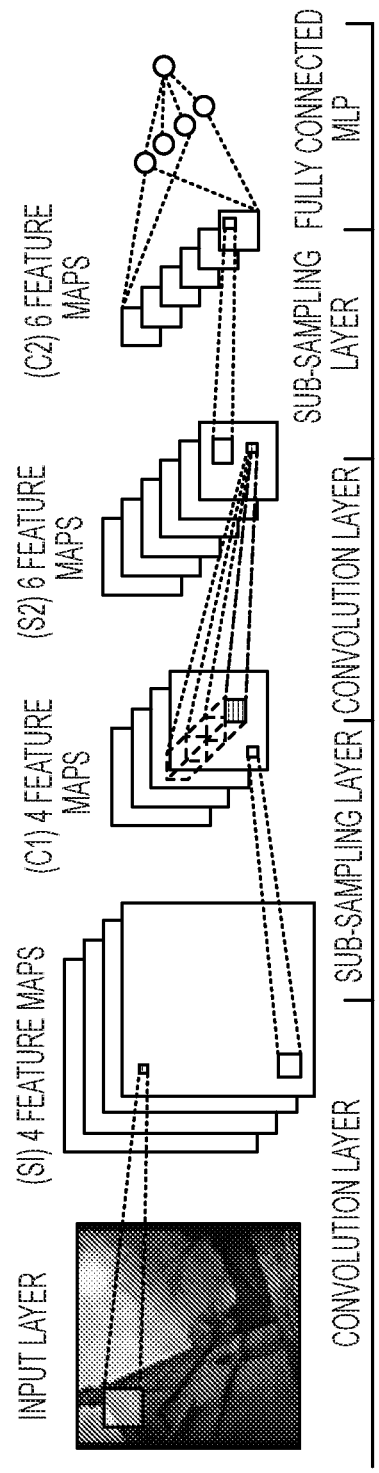
FIG. 2 shows multiple sampling layers according to systems and methods herein.

Referring to FIG. 2, typically, convolutional layers consist of a rectangular grid of neurons. Each convolutional layer requires that the previous layer also be a rectangular grid of neurons. Each neuron takes inputs from a rectangular section of the previous layer; the weights for this rectangular section are the same for each neuron in the convolutional layer. Thus, the convolutional layer is an image convolution of the previous layer, where the weights specify the convolution filter. In addition, there may be several grids in each convolutional layer; each grid takes inputs from all the grids in the previous layer, using potentially different filters.

After each convolutional layer, there may be a pooling layer, which combines the outputs of neuron clusters. The pooling layer takes small rectangular blocks from the convolutional layer and subsamples it to produce a single output from that block. There are several ways to perform pooling, such as taking the average or the maximum, or a learned linear combination of the neurons in the block.

Convolutional networks may include local or global pooling layers. They also consist of various combinations of convolutional and fully connected layers, with pointwise nonlinearity applied at the end of or after each layer. To reduce the number of free parameters and improve generalization, a convolution operation on small regions of input may be introduced. One major advantage of convolutional networks is the use of shared weight in the convolutional layers, which means that the same filter (weights bank) is used for each pixel in the layer; this both reduces memory footprint and improves performance.

After several convolutional and pooling layers, the high-level reasoning in the neural network is done via fully connected layers. A fully connected layer takes all neurons in the previous layer (be it fully connected, pooling, or convolutional) and connects it to every single neuron it has. Fully connected layers are not spatially located anymore, so there can be no convolutional layers after a fully connected layer.

The introduction of CNNs and the availability of large-scale training data have had a profound impact on the computer vision community. Deep-network based approaches have demonstrated successes over the state-of-the-art in image classification, object detection, and many other recognition or even non-recognition tasks. However, there is a technical issue in the training and testing of the CNNs: the prevalent CNNs require a fixed input image size (e.g., 256×256), which limits both the aspect ratio and the scale of the input image. When applied to images of arbitrary sizes, most current methods fit the input image to the required size by cropping or warping. A proper cropping, e.g., finding windshields of vehicles, requires additional process while warping, e.g., aspect ratio modification or resolution reduction, can potentially result in unwanted geometric distortion or loss of information, which in turn compromise the classification/recognition accuracy. Current processes for vehicle passenger detection employ a two-stage process, which requires windshield/side-window cropping before image classification. Although front windshield localization has achieved above 99% accuracy, back-row side-window localization has turned out to be a very challenging task due to factors such as large variations in window shapes, multiple-rows of back seats, etc. An alternative to the two-stage process is to use the entire image for classification without region-of-interest (ROI) cropping. However, to fit the input image to the size requirement of the current CNNs, the input images have to be scaled down by a factor of 8. The downscaling of the window region will generate an ROI with only a few hundreds of pixels, which could have a significant impact on the classification accuracy. Hence, there is a desire to modify the current CNN architectures to accommodate large-size input images while maintaining training efficiency.

According to systems and methods herein, the size of the fully connected layer is maintained by adding additional pooling layers at different stages of the network (e.g., middle or late). However, because of the increased size of the network, the convergence of the training can be slow or not feasible. To overcome this challenge, a two-step training process is used. The two-step training process trains the smaller network first then uses the weights to initialize the expanded network. That is, the architecture adds additional convolutional layers (or modules) to accommodate large-size input images (e.g. 512, 1024). The two-step training process first trains the small CNNs with reduced-size images, then uses the weights to initialize the expanded CNNs for training/testing with large-size images.

According to the disclosed method, a CNN is expanded, as shown in FIGS. 3A-3F, and the expanded network is trained to be employed with many different types of deep learning architectures, such as the AlexNet and VGG. The present description focuses on the GoogLeNet, because it has been demonstrated that the GoogLeNet outperforms other architectures for vehicle passenger occupancy detection.

The GoogLeNet achieved the best results for classification and detection in the ImageNet Large-Scale Visual Recognition Challenge 2014 (ILSVRC14). Compared to other CNN architectures, GoogLeNet is a deep architecture, where the word "deep" is meant both in the sense that it introduces a new level of organization as well as in the more direct sense of increased network depth.

Although it is easy to just simply modify the parameters of the convolutional filters to ensure that the feature size fits the size requirements of the fully connected layers for large-size input images, this simple approach could potentially lose image details as the input image size gets larger and larger, especially when the region of interest (e.g., the back-row side-windows, moreover, the back-seat passengers) is relatively small in the original image (e.g., side-windows of vehicles).

The convolutional neural network (CNN), according to systems and methods herein, is illustrated in FIGS. 3A-3F, and is generally referred to as 200. The CNN 200 includes a plurality of layers 203. For image processing, CNN 200 operates in two-dimensions. Each layer 203 includes a plurality of groups of neurons. Each group of neurons includes a plurality of neurons. Each group of neurons within a layer 203 operates on the same input signal or stimulus in a parallel fashion. The neurons output a non-linear function of the linear combination of the inputs, as illustrated in FIG. 1. The neurons in each group of neurons in a layer are feature detectors that analyze an image for the same feature in different locations of the image. Each group of neurons detects a different feature. For each pixel in an input image, the pixel's intensity is encoded as the value for a corresponding neuron in the input layer. For example, for an input image having 256×256 pixels, the CNN has 65,536 (=256×256) input neurons.

Figure 3A:
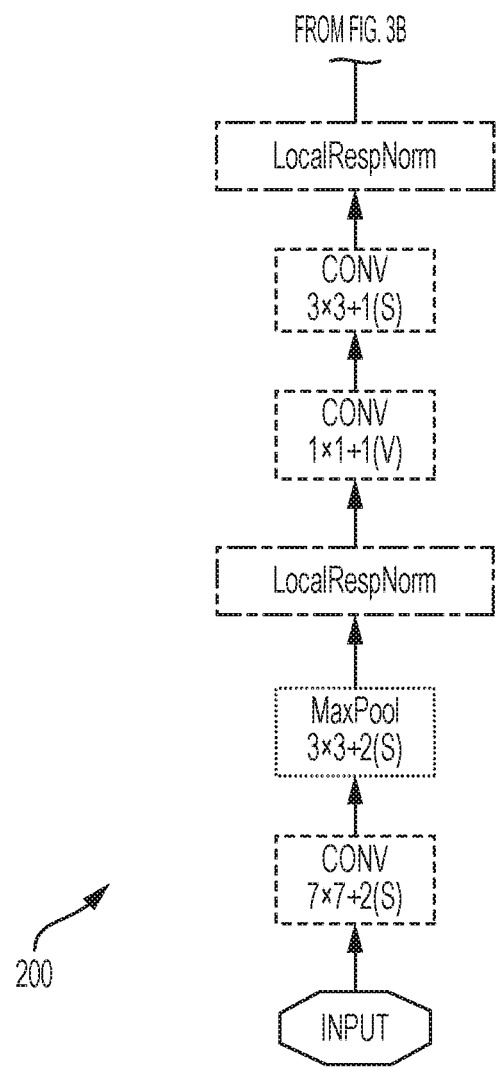
FIGS. 3A-3F show a convolutional neural network according to systems and methods herein.
Figure 3B:
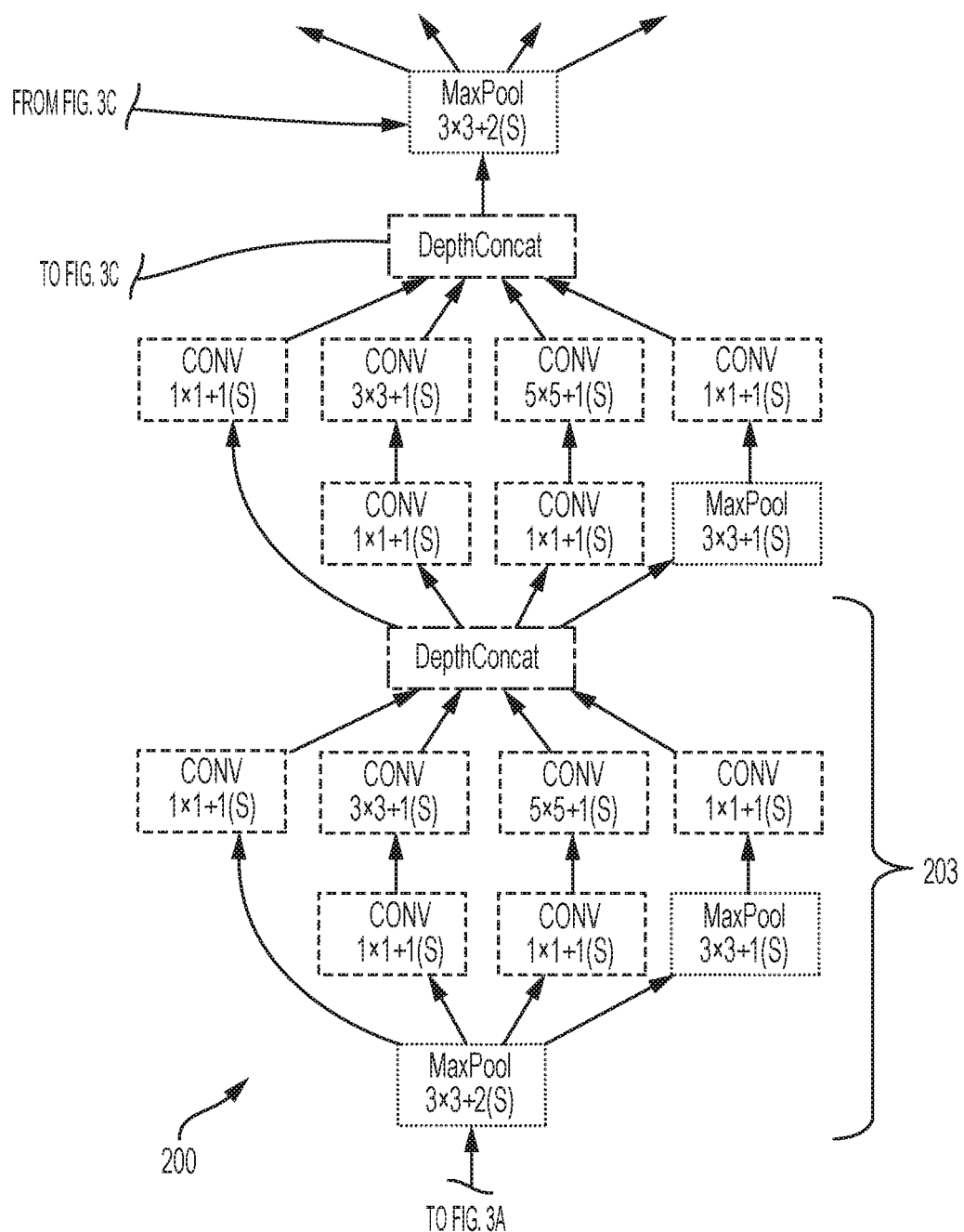
Figure 3C:
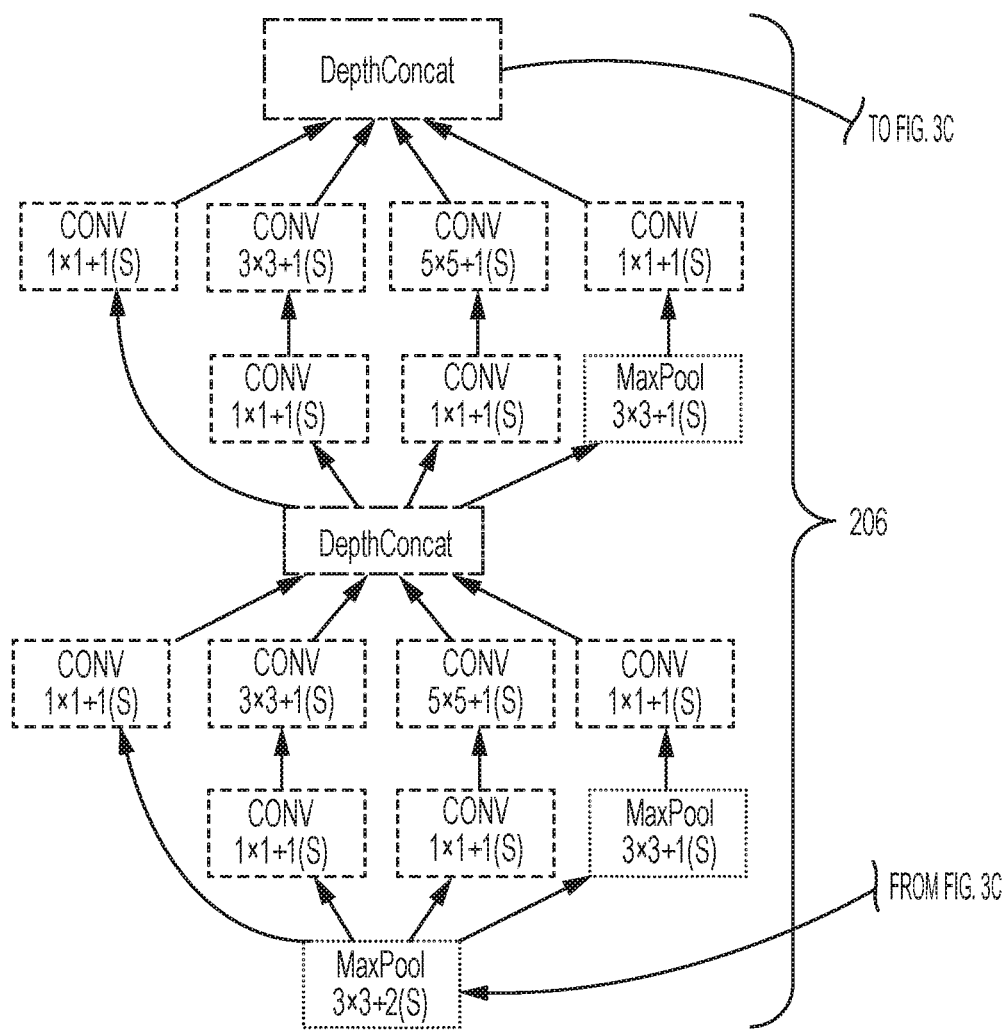
Figure 3D:
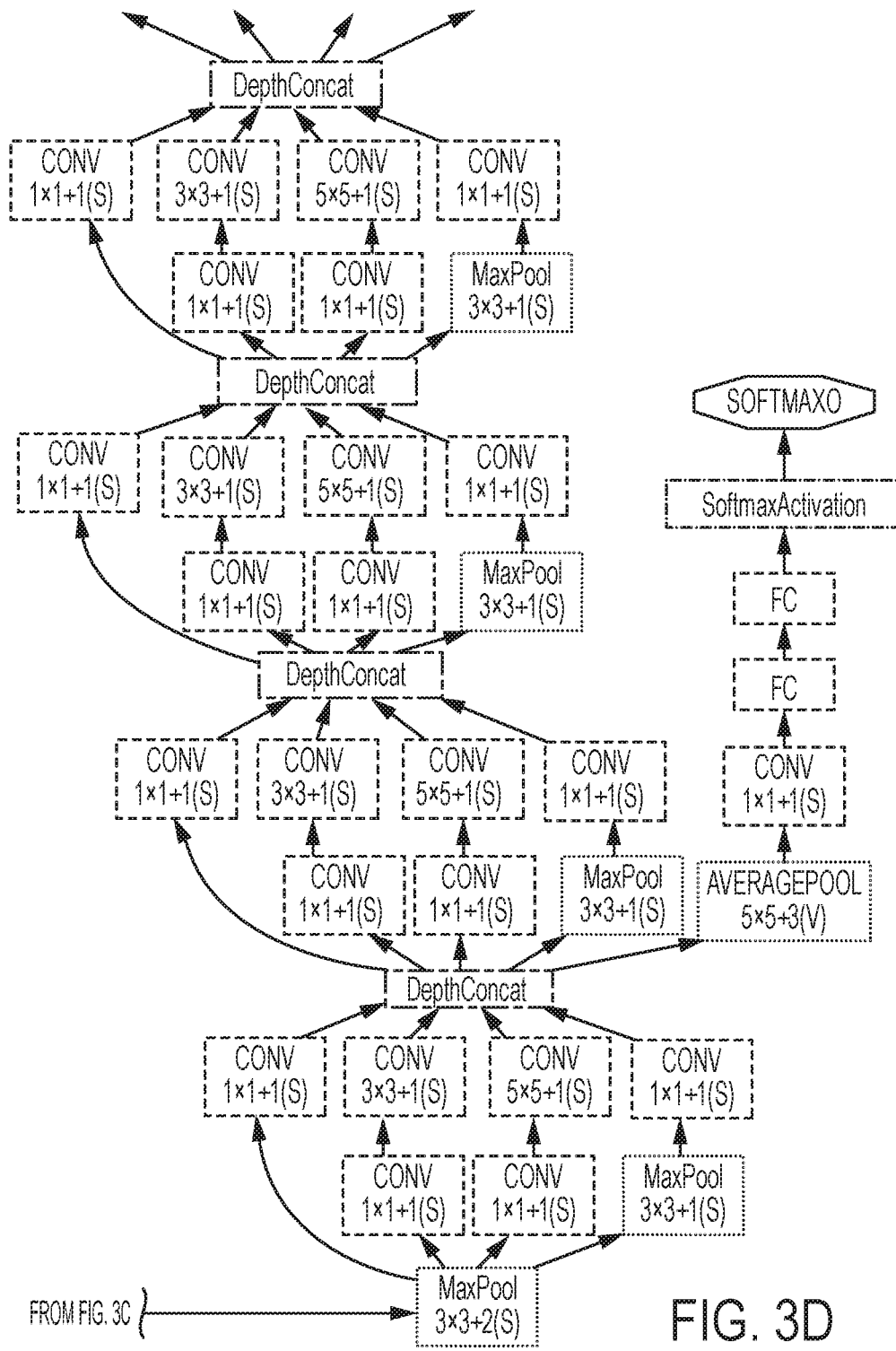
Figure 3E:
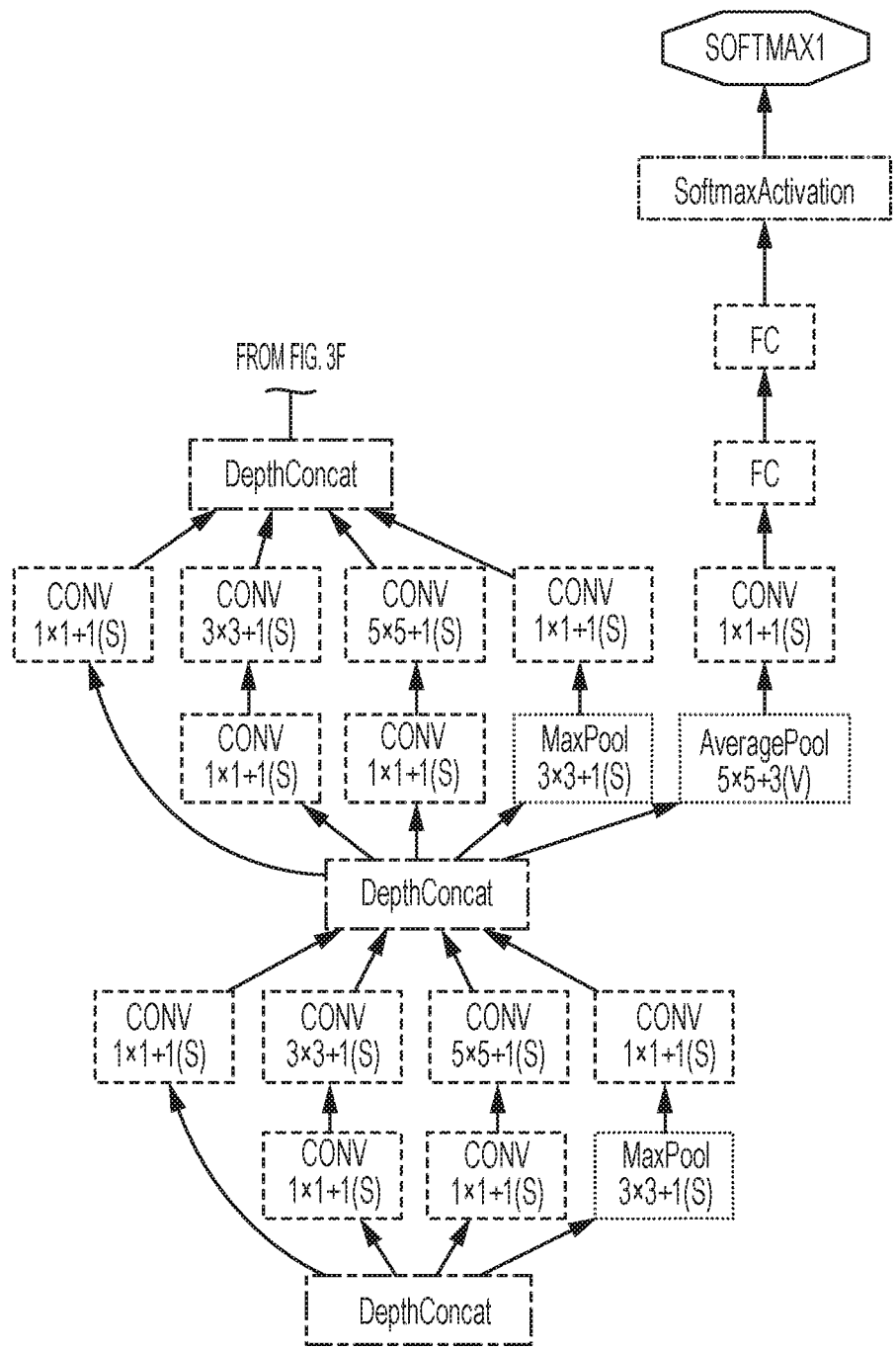
Figure 3F:
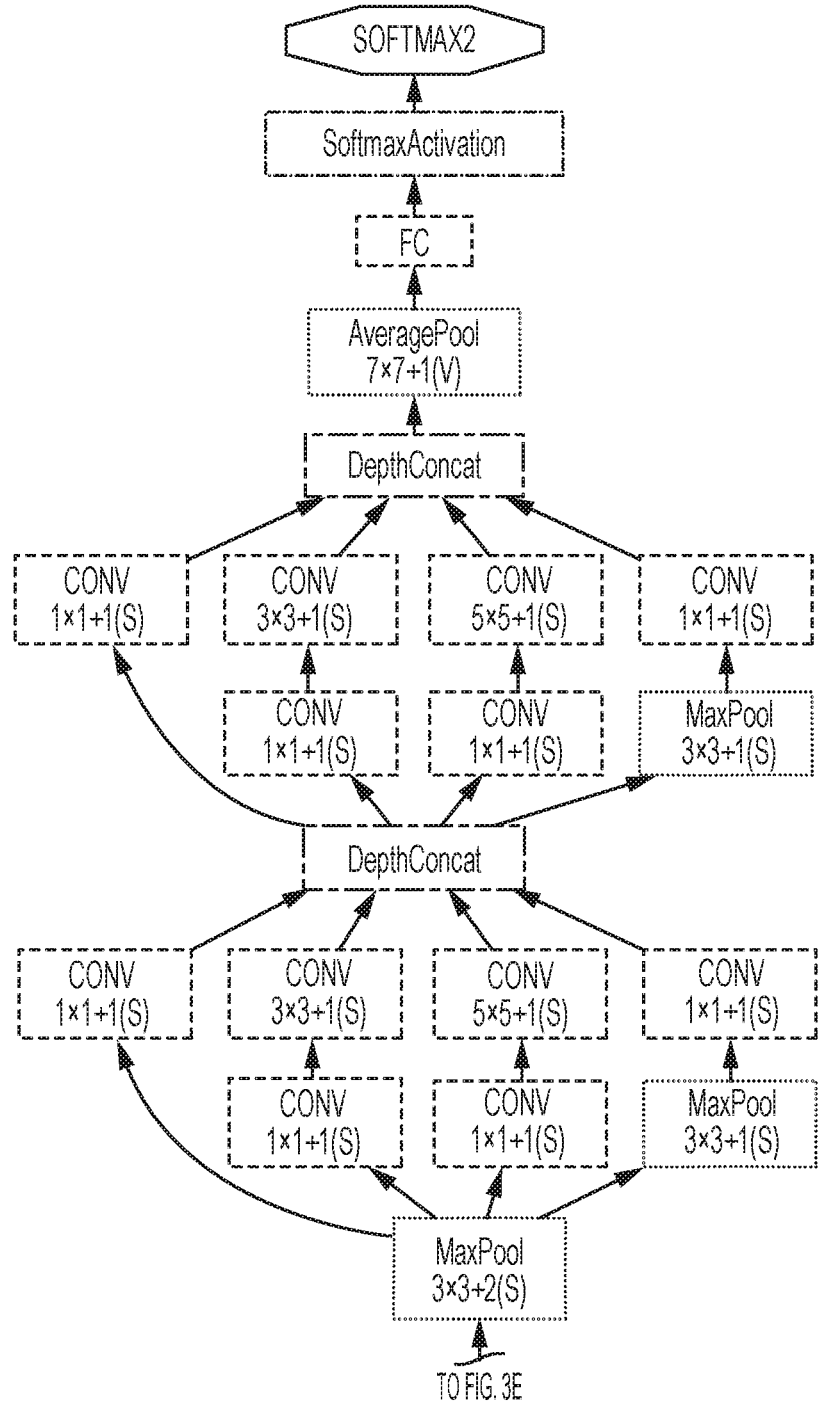
Figure 4:
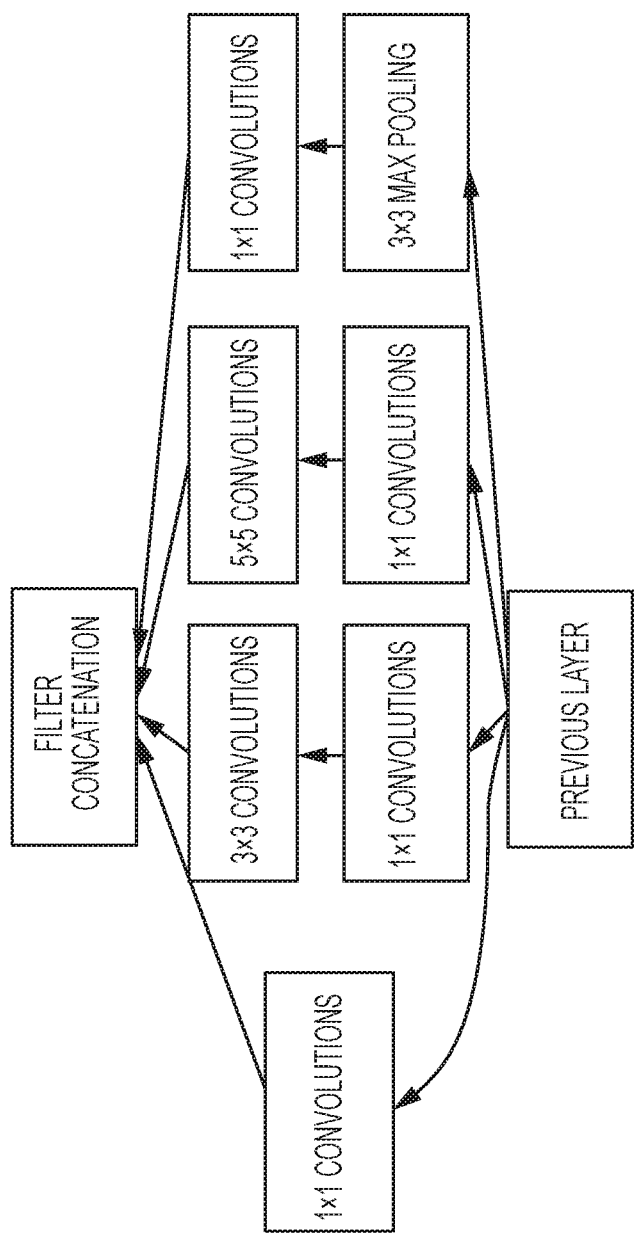
FIG. 4 shows a module of a convolutional neural network having dimension reduction according to systems and methods herein.

FIG. 4 shows an exemplary convolutional layer (or module), according to systems and methods herein. 1×1 convolutions are used to compute reductions before using 3×3 and 5×5 convolutions. In addition, a pooling path is added in each module. As the size of the image increases, the number of layers of the CNN must increase, as well. Hence, additional modules may be added to the CNN. One example is shown in FIG. 3C. The additional modules 206 accommodate twice the input image size, i.e., from 256 to 512.

However, with the expanded network, the training can become very challenging with the extra set of parameters. Therefore, a two-step training process for the CNN 200 is used: first, train the original CNN (i.e., without the additional modules 206); then, train the expanded network using the obtained weights to populate the existing modules and initialize newly inserted modules with random weights with relatively small learning ratio. Our experiments show that this approach converges and results in good classification performance.

The performance of the described approach was evaluated for the application of vehicle occupancy detection. In the study, the goal was to classify an image in terms of whether at least one passenger is present in the rear-row seat of a vehicle. The training dataset consisted of a total of 32,260 images, with the same number of passenger and no passenger images. The testing data set had 2082 images. For comparison, the exact same images were processed using three different input sizes, with 256×256, 512×512, and 1024×1024 input sizes with and without the two-step training process. The table below shows the classification accuracy.

|  | 256 × 256 | 512 × 512 | 1024 × 1024 |
| --- | --- | --- | --- |
| Without two-step training | 90.7 | 92.4 | 67.7 |
| With two-step training | N/A | 93.0 | 93.5/94.2 |

Note that in the fourth cell of the first row, with 1024× 1024 input, without the two-step training process, the training didn't converge even after 90,000 iterations. The two results listed in the $4^{th}$ cell of the second row were obtained with the initializations taken from the 512×512 in the first and second rows, respectively. The networks used in the first row were all started from scratch. When considered the error rate in side-window localization, the accuracy listed in the second row of the table is on par with the current classification approaches.

Figure 5:
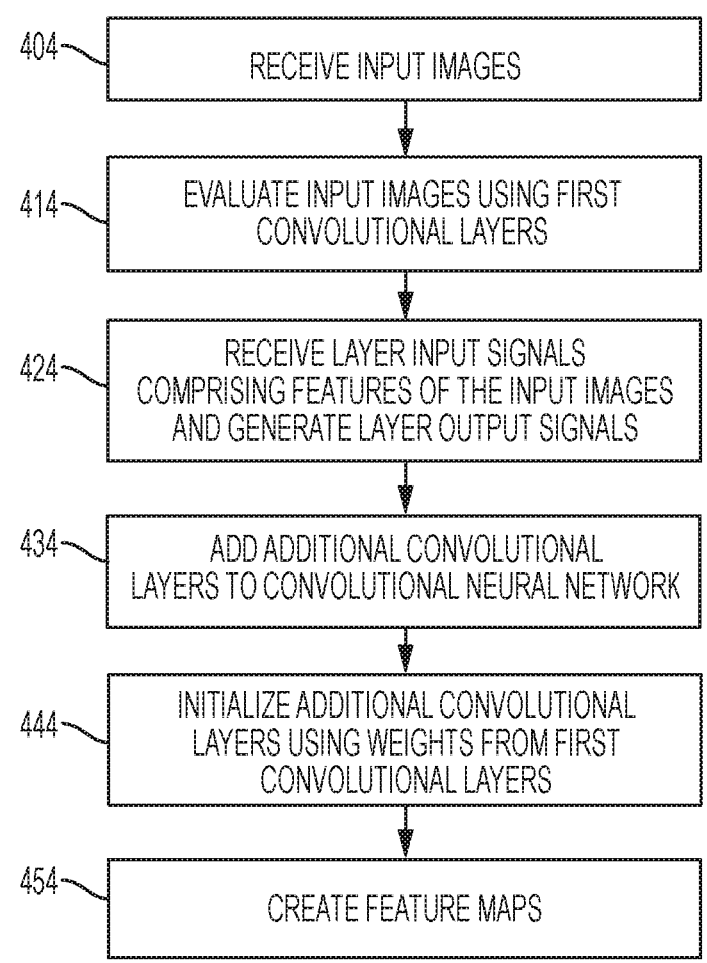
FIG. 5 is a flow chart according to methods herein.

FIG. 5 is a flow diagram illustrating the processing flow of an exemplary method according to the present disclosure. The method is useful for training a convolutional neural network. At 404, input images are received into a computerized device having an image processor. At 414, the image processor evaluates the input images using first convolutional layers. The number of first convolutional layers is based on a first size for the input images. Each layer of the first convolutional layers receives layer input signals comprising features of the input images and generates layer output signals, at 424. The layer input signals include signals from the input images and ones of the layer output signals from previous layers within the first convolutional layers. At 434, responsive to an input image being a second size larger than the first size, additional convolutional layers are added to the convolutional neural network. The number of additional convolutional layers is based on the second size in relation to the first size. At 444, the additional convolutional layers are initialized using weights from the first convolutional layers. Feature maps comprising the layer output signals are created, at 454.

Figure 6:
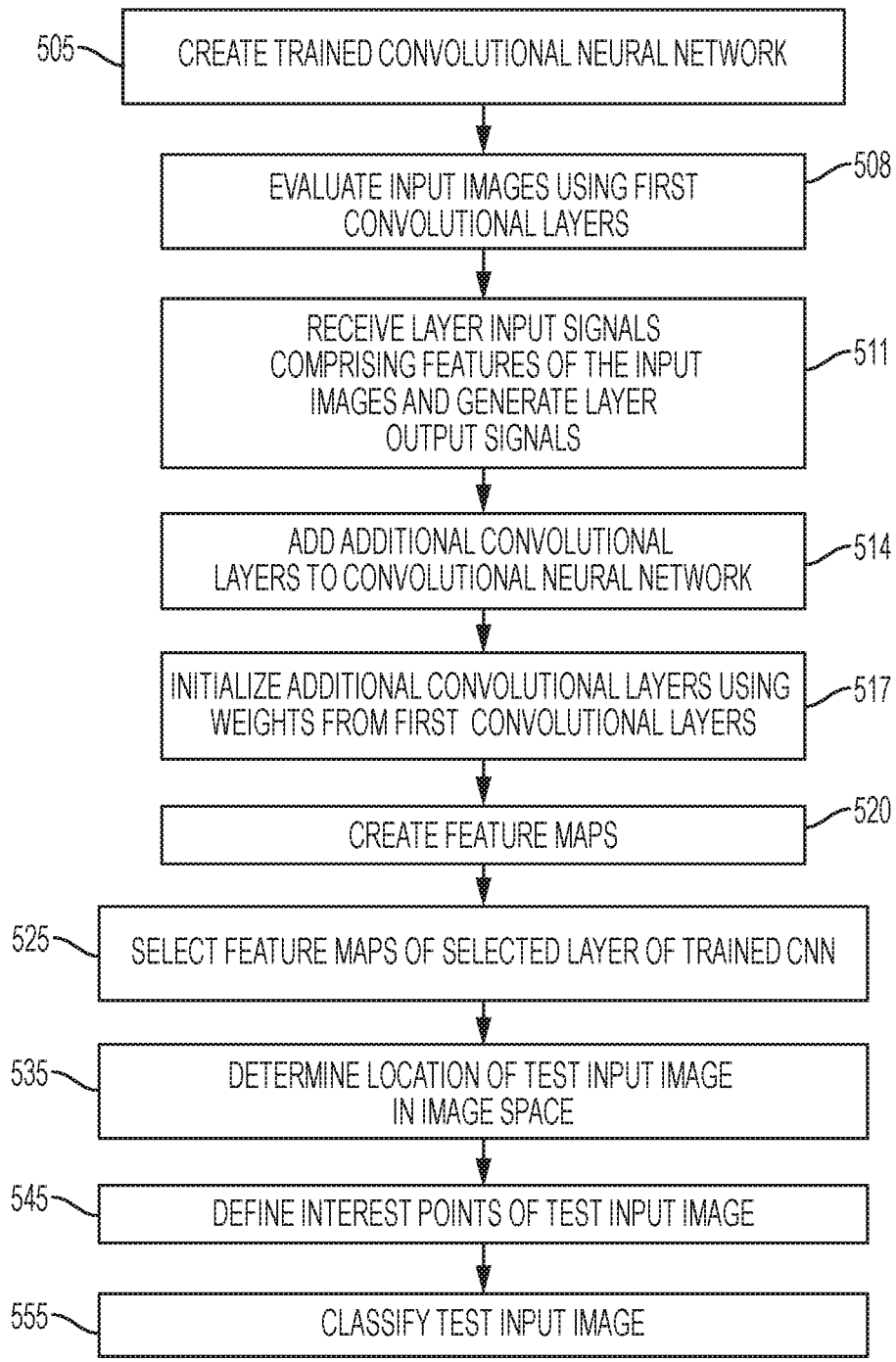
FIG. 6 is a flow chart according to methods herein.

FIG. 6 is a flow diagram illustrating the processing flow of an exemplary method according to the present disclosure. At 505, a trained convolutional neural network (CNN) is created. The training of the CNN comprises evaluating training input images using first convolutional layers, at 508. The number of first convolutional layers is based on a first size for the training input images. Each layer of the first convolutional layers receives layer input signals comprising features of the input images and generates layer output signals, at 511. Responsive to a training input image being a second size larger than the first size, additional convolutional layers are added to the CNN, at 514. The number of additional convolutional layers is based on the second size in relation to the first size. The additional convolutional layers are initialized using weights from the first convolutional layers, at 517. Feature maps comprising the layer output signals are created, at 520. At 525, a plurality of feature maps of an output of at least one selected layer of the trained CNN is selected according to values attributed to the plurality of feature maps by the trained CNN. At 535, for each of the plurality of feature maps, a location corresponding thereto in an image space of a test input image is determined. At 545, interest points of the test input image are defined, based on the locations corresponding to the plurality of feature maps. At 555, the test input image is classified, based on the interest points.

Figure 7:
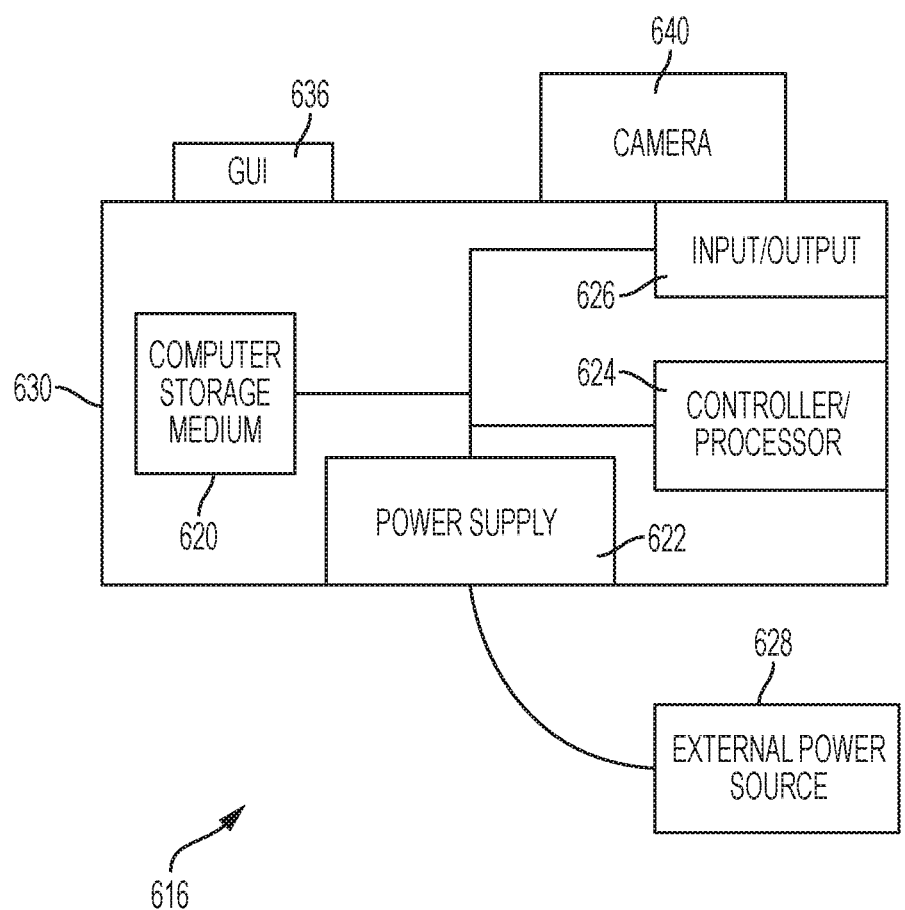
FIG. 7 is a side-view schematic diagram of a device according to systems and methods herein.
Figure 8:
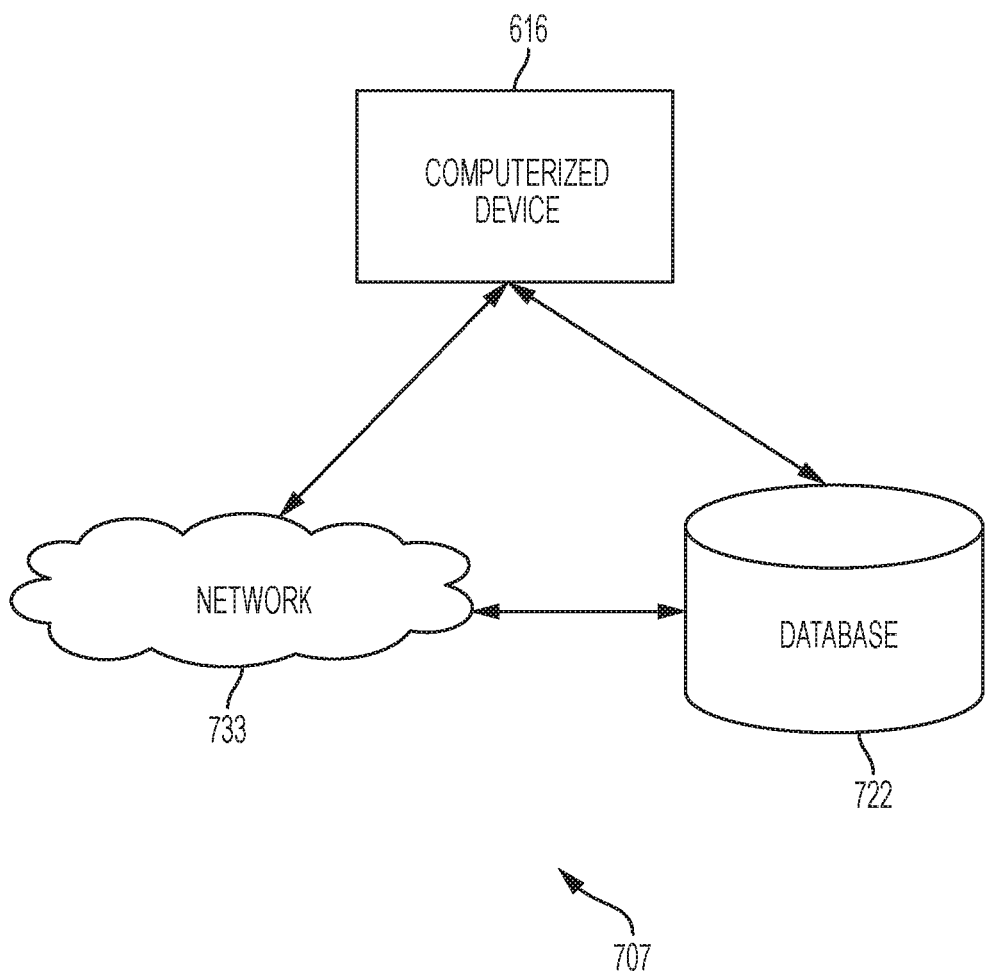
FIG. 8 is a block diagram of a system according to systems and methods herein.

FIG. 7 illustrates a computerized device 616, which can be used with systems and methods herein and can comprise, for example, a personal computer, a portable computing device, etc. The computerized device 616 includes a controller/processor 624 and a communications port (input/output) 626 operatively connected to the controller/processor 624. As described above, the controller/processor 624 may also be connected to and to a computerized network 733 external to the computerized device 616, such as shown in FIG. 8. In addition, the computerized device 616 can include at least one accessory functional component; such as a user interface assembly (GUI) 636 that also operates on the power supplied from the external power source 628 (through the power supply 622) and an image input device, such as camera 640.

The controller/processor 624 controls the various actions of the computerized device 616, as described below. A non-transitory computer storage medium device 620 (which can be optical, magnetic, capacitor based, etc.) is readable by the controller/processor 624 and stores instructions that the controller/processor 624 executes to allow the computerized device 616 to perform its various functions, such as those described herein.

According to systems and methods herein, the controller/processor 624 may comprise a graphical processing unit or special purpose processor that is specialized for processing image data and includes a dedicated processor that would not operate like a general purpose processor because the dedicated processor has application specific integrated circuits (ASICs) that are specialized for the handling of image processing operations, processing image data, comparing pixel values, etc. In one example, the computerized device 616 is special purpose machine that includes a specialized image processing card having unique ASICs for providing image processing, includes specialized boards having unique ASICs for input and output devices to speed network communications processing, a specialized ASIC processor that performs the logic of the methods described herein using dedicated unique hardware logic circuits, etc.

The input/output device 626 may be used for communications to and from the computerized device 616. The controller/processor 624 controls the various actions of the computerized device. A non-transitory computer storage medium 620 (which can be optical, magnetic, capacitor based, etc.) is readable by the controller/processor 624 and stores instructions that the controller/processor 624 executes to allow the computerized device 616 to perform its various functions, such as those described herein. Thus, as shown in FIG. 7, a body housing 630 has one or more functional components that operate on power supplied from the external power source 628, which may comprise an alternating current (AC) power source, through the power supply 622. The power supply 622 can comprise a power storage element (e.g., a battery) that connects to the external power source 628 and converts the external power into the type of power needed by the various components of the computerized device 616.

Those skilled in the art would appreciate that the computer storage medium 620 is not limited to a peripheral device having the program stored therein, which is distributed separately from the device for providing the program to the user. Examples of a removable medium include a magnetic disk (including a floppy disk), an optical disk (including a Compact Disk-Read Only Memory (CD-ROM) and a Digital Versatile Disk (DVD)), a magneto-optical disk (including a Mini-Disk (MD) (registered trademark)), and a semiconductor memory. Alternatively, the computer storage medium 620 may be a hard disk, or the like, which has the program stored therein and is distributed to the user together with the device that contains them.

As would be understood by those ordinarily skilled in the art, the computerized device 616 shown in FIG. 7 is only one example and the systems and methods herein are equally applicable to other types of devices that may include fewer components or more components.

FIG. 8 is a general overview block diagram of a system, indicated generally as 706, for communication between a computerized device 616 and a database 722. The computerized device 616 may comprise any form of processor as described in detail above. The computerized device 616 can be programmed with appropriate application software to implement the methods described herein. Alternatively, the computerized device 616 is a special purpose machine that is specialized for processing image data and includes a dedicated processor that would not operate like a general purpose processor because the dedicated processor has application specific integrated circuits (ASICs) that are specialized for the handling of image processing operations, processing pixel data, etc. In one example, the computerized device 616 is special purpose machine that includes a specialized card having unique ASICs for providing image processing instructions, includes specialized boards having unique ASICs for input and output devices to speed network communications processing, a specialized ASIC processor that performs the logic of the methods described herein (such as the processing shown in FIGS. 5 and 6) using dedicated unique hardware logic circuits, etc.

Database 722 includes any database or any set of records or data that the computerized device 616 desires to retrieve. Database 722 may be any organized collection of data operating with any type of database management system. The database 722 may contain matrices of datasets comprising multi-relational data elements.

The database 722 may communicate with the computerized device 616 directly. Alternatively, the database 722 may communicate with the computerized device 616 over network 733. The network 733 comprises a communication network either internal or external, for affecting communication between the computerized device 616 and the database 722. For example, network 733 may comprise a local area network (LAN) or a global computer network, such as the Internet.

As will be appreciated by one skilled in the art, aspects of the devices and methods herein may be embodied as a system, method, or computer program product. Accordingly, aspects of the present disclosure may take the form of an entirely hardware system, an entirely software system (including firmware, resident software, micro-code, etc.) or a system combining software and hardware aspects that may all generally be referred to herein as a "circuit," "module", or "system." Furthermore, aspects of the present disclosure may take the form of a computer program product embodied in one or more computer readable medium(s) having computer readable program code embodied thereon.

The flowchart and block diagrams in the figures illustrate the architecture, functionality, and operation of possible implementations of systems, methods, and computer program products according to various devices and methods herein. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the present disclosure are described herein with reference to flowchart illustrations and/or block diagrams of methods, apparatus (systems), and computer program products according to various systems and methods. It will be understood that each block of the flowchart illustrations and/or two-dimensional block diagrams, and combinations of blocks in the flowchart illustrations and/or block diagrams, can be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the processes/acts specified in the flowchart and/or block diagram block or blocks.

According to a further system and method herein, an article of manufacture is provided that includes a tangible computer readable medium having computer readable instructions embodied therein for performing the steps of the computer implemented methods, including, but not limited to, the methods illustrated in FIGS. 5 and 6. Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. Any of these devices may have computer readable instructions for carrying out the steps of the methods described above with reference to FIGS. 5 and 6.

The computer program instructions may be stored in a computer readable medium that can direct a computer, other programmable data processing apparatus, or other devices to process in a particular manner, such that the instructions stored in the computer readable medium produce an article of manufacture including instructions which implement the process/act specified in the flowchart and/or block diagram block or blocks.

Furthermore, the computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the processes/acts specified in the flowchart and/or block diagram block or blocks.

In case of implementing the systems and methods herein by software and/or firmware, a program constituting the software may be installed into a computer with dedicated hardware, from a storage medium or a network, and the computer is capable of performing various processes with various programs installed therein.

In the case where the above-described series of processing is implemented with software, the program that constitutes the software may be installed from a network such as the Internet or a storage medium such as the removable medium.

Those skilled in the art would appreciate that the storage medium is not limited to a peripheral device having the program stored therein, which is distributed separately from the device for providing the program to the user. Examples of a removable medium include a magnetic disk (including a floppy disk), an optical disk (including a Compact Disk-Read Only Memory (CD-ROM) and a Digital Versatile Disk (DVD)), a magneto-optical disk (including a Mini-Disk (MD) (registered trademark)), and a semiconductor memory. Alternatively, the computer storage medium may be a hard disk, or the like, which has the program stored therein and is distributed to the user together with the device that contains them.

The hardware described herein plays a significant part in permitting the foregoing method to be performed, rather than function solely as a mechanism for permitting a solution to be achieved more quickly, (i.e., through the utilization of a computer for performing calculations). Specifically, printers, scanners, and image processors that alter electronic documents each play a significant part in the methods (and the methods cannot be performed without these hardware elements). Therefore, these hardware components are fundamental to the methods being performed and are not merely for the purpose of allowing the same result to be achieved more quickly.

As would be understood by one ordinarily skilled in the art, the processes described herein cannot be performed by human alone (or one operating with a pen and a pad of paper) and instead such processes can only be performed by a machine. Specifically, processes such as printing, scanning, electronically altering documents using an image processor, etc., require the utilization of different specialized machines. Therefore, for example, the printing/scanning performed by the user device cannot be performed manually (because it can only be done by printing and scanning machines) and is integral with the processes performed by methods herein. In other words, these various machines are integral with the methods herein because the methods cannot be performed without the machines (and cannot be performed by humans alone).

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, processors, etc., are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA, and the details of such devices are not discussed herein for purposes of brevity and reader focus.

The terminology used herein is for the purpose of describing particular examples of the disclosed structures and methods and is not intended to be limiting of this disclosure. For example, as used herein, the singular forms 'a', 'an', and 'the' are intended to include the plural forms as well, unless the context clearly indicates otherwise. Additionally, as used herein, the terms 'comprises', 'comprising', 'includes', and/or 'including', when used in this specification, specify the presence of stated features, integers, steps, operations, elements, and/or components, but do not preclude the presence or addition of one or more other features, integers, steps, operations, elements, components, and/or groups thereof. Further, the terms 'automated' or 'automatically' mean that once a process is started (by a machine or a user), one or more machines perform the process without further input from any user.

The corresponding structures, materials, acts, and equivalents of all means or step plus process elements in the claims below are intended to include any structure, material, or act for performing the process in combination with other claimed elements as specifically claimed. The descriptions of the various devices and methods of the present disclosure have been presented for purposes of illustration but are not intended to be exhaustive or limited to the devices and methods disclosed. Many modifications and variations will be apparent to those of ordinary skill in the art without departing from the scope and spirit of the described devices and methods. The terminology used herein was chosen to best explain the principles of the devices and methods, the practical application or technical improvement over technologies found in the marketplace, or to enable others of ordinary skill in the art to understand the devices and methods disclosed herein.

It will be appreciated that the above-disclosed and other features and processes, or alternatives thereof, may be desirably combined into many other different systems or applications. Those skilled in the art may subsequently make various presently unforeseen or unanticipated alternatives, modifications, variations, or improvements therein, which are also intended to be encompassed by the following claims. Unless specifically defined in a specific claim itself, steps or components of the systems and methods herein should not be implied or imported from any above example as limitations to any particular order, number, position, size, shape, angle, color, temperature, or material.

What is claimed is:

1. A method of training a convolutional neural network (CNN), said method comprising:
    receiving input images into a computerized device having an image processor;
    evaluating, using said image processor, said input images using a number of first convolutional layers, the number of said first convolutional layers being based on a first size for said input images, each layer of said first convolutional layers receiving layer input signals comprising features of said input images and generating layer output signals, said layer input signals including signals from the input images and ones of said layer output signals from previous layers within said first convolutional layers;
    obtaining weights from said first convolutional layers;
    responsive to an input image being a second size, said second size being larger than said first size, adding a number of additional convolutional layers to said convolutional neural network (CNN), the number of said additional convolutional layers being based on said second size in relation to said first size;
    initializing said additional convolutional layers using said weights from said first convolutional layers; and
    creating feature maps comprising said layer output signals.

2. The method according to claim 1, said image processor comprising a graphical processing unit.

3. The method according to claim 1, said first size for said input images comprising 256×256 pixels.

4. The method according to claim 1, said second size for said input images comprising one of 512×512 pixels and 1024×1024 pixels.

5. The method according to claim 1, further comprising modifying hyperparameters of said CNN based on said additional convolutional layers.

6. The method according to claim 5, said modifying said hyperparameters of said CNN comprising introducing additional pooling layers that reduce the size of intermediate network features.

7. The method according to claim 1, further comprising associating said feature maps with designated image classifications.

8. The method according to claim 1, each of said input images comprising a set of pixels.

9. A method, comprising:
 receiving input images into a computerized device having an image processor, said input images comprising training images;
 evaluating, using said image processor, said input images using a first number of first convolutional layers of a convolutional neural network (CNN), the first number of said first convolutional layers being based on a first size for said input images, each layer of said first convolutional layers receiving layer input signals comprising features of said input images and generating first layer output signals from said first convolutional layers, said layer input signals including signals from the input images and ones of said first layer output signals from previous layers within said first convolutional layers;
 obtaining weights from said first convolutional layers;
 responsive to an input image being a second size, said second size being larger than said first size, said image processor adding a second number of additional convolutional layers to said CNN, the second number of said additional convolutional layers being based on said second size in relation to said first size;
 initializing, using said image processor, said additional convolutional layers with said weights from said first convolutional layers;
 evaluating, using said image processor, said input image having said second size using the additional convolutional layers, each layer of said additional convolutional layers receiving layer input signals comprising features of said input image and generating second layer output signals from said additional convolutional layers; and
 creating, using said image processor, feature maps comprising said first layer output signals from said first convolutional layers and said second layer output signals from said additional convolutional layers.

10. The method according to claim 9, said image processor comprising a graphical processing unit.

11. The method according to claim 9, said first size for said input images comprising 256×256 pixels.

12. The method according to claim 9, said second size for said input images comprising one of 512×512 pixels and 1024×1024 pixels.

13. The method according to claim 9, further comprising modifying hyperparameters of said CNN based on said additional convolutional layers.

14. The method according to claim 13, said modifying said hyperparameters of said CNN comprising introducing additional pooling layers that make intermediate network features smaller.

15. The method according to claim 9, further comprising associating said feature maps with designated image classifications.

16. The method according to claim 9, each of said input images comprising a set of pixels.

17. A method of training a convolutional neural network (CNN), said method comprising:
 inputting training images to said CNN, each of said training images comprising a set of pixels;
 evaluating said training images using a first number of first convolutional layers of said CNN, the first number of said first convolutional layers being based on training images comprising 256×256 pixels, each layer of said first convolutional layers receiving layer input signals comprising features of said training images and generating first layer output signals from said first convolutional layers;
 obtaining weights from said first convolutional layers;
 responsive to a large training image comprising one of 512×512 pixels and 1024×1024 pixels, adding a second number of additional convolutional layers to said CNN, the second number of said additional convolutional layers being based on the size of said large training image in relation to a training image comprising 256×256 pixels;
 initializing said additional convolutional layers with said weights from said first convolutional layers;
 evaluating said large training image using the additional convolutional layers, each layer of said additional convolutional layers receiving layer input signals comprising features of said large training image and generating second layer output signals from said additional convolutional layers; and
 creating feature maps comprising said first layer output signals from said first convolutional layers and said second layer output signals from said additional convolutional layers.

18. The method according to claim 17, further comprising modifying hyperparameters of said CNN based on said additional convolutional layers, said modifying said hyperparameters of said CNN comprising introducing additional pooling layers that make intermediate network features smaller.

19. The method according to claim 17, further comprising associating said feature maps with designated image classifications.

20. The method according to claim 17, wherein each layer of said CNN receives layer input signals including signals from the training images and ones of the layer output signals from previous layers within the convolutional layers of said CNN.

* * * * *